(12) United States Patent
Blunt et al.

(10) Patent No.: US 9,853,314 B2
(45) Date of Patent: Dec. 26, 2017

(54) RELIEF DESIGN FOR FUEL CELL PLATES

(71) Applicants: Daimler AG, Stuttgart (DE); Ford Motor Company, Dearborn, MI (US)

(72) Inventors: Ryan Blunt, Vancouver (CA); David Adam, North Vancouver (CA); Stephen Hamada, Vancouver (CA); Wayne Dang, Burnaby (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 0 days.

(21) Appl. No.: 15/123,358

(22) PCT Filed: Mar. 13, 2015

(86) PCT No.: PCT/IB2015/000327
§ 371 (c)(1),
(2) Date: Sep. 2, 2016

(87) PCT Pub. No.: WO2015/145233
PCT Pub. Date: Oct. 1, 2015

(65) Prior Publication Data
US 2017/0077536 A1    Mar. 16, 2017

Related U.S. Application Data

(60) Provisional application No. 61/969,229, filed on Mar. 23, 2014.

(51) Int. Cl.
*H01M 8/04746* (2016.01)
*H01M 8/241* (2016.01)
(Continued)

(52) U.S. Cl.
CPC ..... *H01M 8/04753* (2013.01); *H01M 8/0258* (2013.01); *H01M 8/04104* (2013.01);
(Continued)

(58) Field of Classification Search
CPC ....... H01M 2008/1095; H01M 8/1004; H01M 8/1018; H01M 8/04253; H01M 8/241;
(Continued)

(56) References Cited

U.S. PATENT DOCUMENTS

2006/0127742 A1    6/2006   Thompson et al.
2008/0113254 A1    5/2008   Christie et al.
(Continued)

FOREIGN PATENT DOCUMENTS

| JP | 2004207039 A | 7/2004 |
|---|---|---|
| WO | 2010003439 A1 | 1/2010 |
| WO | 2014001842 A1 | 1/2014 |

OTHER PUBLICATIONS

International Search Report dated Jun. 18, 2015, in International Application No. PCT/IB2015/000327.

*Primary Examiner* — Jane Rhee
(74) *Attorney, Agent, or Firm* — Patent Central LLC; Stephan A. Pendorf

(57) ABSTRACT

Flow field plates in solid polymer electrolyte fuel cells can be subject to ice blockages in certain areas during freeze start-up, e.g. the backfeed ports and slots used in some flow field plate designs which connect an outlet plenum channel for a reactant to its outlet. By incorporating a similar and adjacent relief backfeed port, slot and plenum channel arrangement in which the relief plenum channel is separated from the outlet plenum channel by a landing, a relief outlet for the reactant is provided through the adjacent gas diffusion layer.

9 Claims, 3 Drawing Sheets

(51) Int. Cl.
 *H01M 8/2483* (2016.01)
 *H01M 8/0258* (2016.01)
 *H01M 8/04089* (2016.01)
 *H01M 8/04082* (2016.01)
 *H01M 8/1004* (2016.01)
 *H01M 8/1018* (2016.01)

(52) U.S. Cl.
 CPC ..... *H01M 8/04201* (2013.01); *H01M 8/1004* (2013.01); *H01M 8/1018* (2013.01); *H01M 8/241* (2013.01); *H01M 8/2483* (2016.02); *H01M 2008/1095* (2013.01)

(58) Field of Classification Search
 CPC ............. H01M 8/2483; H01M 8/0258; H01M 8/04104; H01M 8/04201
 See application file for complete search history.

(56) References Cited

U.S. PATENT DOCUMENTS

| | | |
|---|---|---|
| 2008/0248369 A1 | 10/2008 | De Vaal et al. |
| 2008/0311461 A1 | 12/2008 | Farrington et al. |
| 2010/0062289 A1 | 3/2010 | Christie et al. |
| 2013/0089802 A1 | 4/2013 | Artibise et al. |
| 2013/0244134 A1 | 9/2013 | Ishida et al. |

RELIEF DESIGN FOR FUEL CELL PLATES

BACKGROUND

Field of the Invention

This invention relates to designs for the reactant flow field plates employed in solid polymer electrolyte fuel cells, and particularly to those subject to ice blockages during freeze start-up.

Description of the Related Art

Fuel cells such as solid polymer electrolyte or proton exchange membrane fuel cells electrochemically convert reactants, namely fuel (such as hydrogen) and oxidant (such as oxygen or air), to generate electric power. Solid polymer electrolyte fuel cells generally employ a proton conducting, solid polymer membrane electrolyte between cathode and anode electrodes. A structure comprising a solid polymer membrane electrolyte sandwiched between these two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications in order to provide a higher output voltage. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant evenly throughout the cells while keeping the coolant reliably separated from the reactants. By appropriate design, a sealed coolant flow field is created when both fuel and oxidant side plates are mated together into a bipolar plate assembly. The sealed coolant flow field can thus serve to distribute coolant evenly throughout the cells while keeping the coolant reliably separated from the reactants.

To provide both reactants and the coolant to and from the individual cells in the stack, a series of outlets and inlets are generally provided at opposing ends of the individual cells such that when the cells are stacked together they form manifolds for these fluids. Further required design features then are passageways in the plates to distribute the bulk fluids in these formed manifolds to and from the various channels in the reactant and coolant flow fields in the plates. Herein, these passageway regions are referred to as the transition regions. The transition regions can themselves comprise numerous fluid distribution channels, e.g. oxidant and/or fuel transition channels.

Another desirable feature in the flow field plates can include the use of what are known in the art as backfeed ports. Such ports allow for bulk fluids to initially be distributed from the formed manifolds to the "back" or inactive sides of the flow field plates and then subsequently to be fed to the active side of the plates through the backfeed ports. A reactant backfeed port is thus fluidly connected to a manifold inlet or outlet for that reactant via some suitable passage formed in the coolant surface of the plate. And the reactant backfeed port is also fluidly connected to the reactant flow field on the reactant surface of the plate via the passageways of the associated transition region.

US2008/0311461 for instance discloses exemplary flow field plate constructions incorporating backfeed features. Further, US2008/0311461 discloses flow field plate embodiments in which the various inlets and outlets forming the reactant manifolds are located on the sides of the flow field plates (i.e. these reactant inlets and outlets are not in line with the flow fields themselves). This configuration of the inlets and/or outlets is known in the art as a sidefeed configuration.

Accumulations of liquid water can undesirably occur for various reasons in various locations within the flow field plates during operation of solid polymer electrolyte fuel cells. And various designs have been developed to address problems caused by such accumulation in the art. JP2004207039 for instance discloses an approach to make the flow of reactant gas possible when a passage in the flow field of a fuel cell is blocked with water drops. Here, recessed groove-shaped gas passages are installed in the flow field to serve as bypass passages so that when other passages are blocked by water drops, reactant gas can instead bypass through a gas diffusion layer.

In fuel cell stacks subject to freezing temperatures, accumulations of liquid water can be additionally problematic because, when the water freezes, the ice formed can undesirably block fluid flows or the associated expansion of the solid ice can cause damage to the cell. Significant sized accumulations of liquid water which may be subject to freezing are therefore generally avoided, either by preventing accumulation in the first place or alternatively by removing them before they have the opportunity to freeze. For example, the approach employed in US2008/0113254 attempts to prevent undesirable water accumulation by use of an appropriate porous medium located between the plates. Alternatively, various techniques are disclosed in the art for removing water from a fuel cell stack prior to shutdown and storage in subzero temperatures.

In other approaches, the aim may be to temporarily tolerate the formation of ice in the plates and address the issues associated with that in other ways. As an example, in US20130089802, flow field plate constructions are disclosed for use in fuel cell stacks that are subject to freezing temperatures. In designs having internal coolant flow fields and reactant backfeed ports, relief ducts are provided in the supporting walls surrounding the backfeed ports in order to allow for ice formation and thus prevent cracking of the plates.

There remains a need however for more options and improvements in addressing problems associated with ice formation in flow field plates of fuel cells subject to below freezing temperatures. This invention fulfills these needs and provides further related advantages.

SUMMARY

In solid polymer electrolyte fuel cells comprising backfeed architecture in the flow field plates, the present invention provides for a relief flow of reactant in situations where blockages occur in a backfeed area (e.g. where ice blockages occur during freeze start-up).

The relevant solid polymer electrolyte fuel cell comprises a membrane electrode assembly comprising a solid polymer electrolyte and an anode and a cathode on opposite sides of the solid polymer electrolyte, an anode gas diffusion layer for a fuel adjacent the anode, and a cathode gas diffusion layer for an oxidant adjacent the cathode. And relief features are incorporated in at least one of the reactant flow field plates in the fuel cell. Such relief features may be used in either the fuel or the oxidant flow field plate or in both. Thus the fuel cell further comprises at least one reactant flow field plate for a reactant selected from the group consisting of the fuel and the oxidant. The reactant flow field plate comprises a reactant flow field which is located adjacent the gas diffusion layer for the reactant. The reactant flow field comprises a plurality of reactant flow field channels fluidly connected to an inlet plenum channel at an inlet end of the reactant flow field and to an outlet plenum channel at an outlet end of the reactant flow field. The outlet plenum channel is configured so as to be transverse to the plurality of reactant flow field channels.

The reactant flow field plate also comprises a reactant inlet, a reactant outlet, a reactant backfeed slot, and a reactant backfeed port. The reactant inlet is near the inlet end of the reactant flow field and is fluidly connected to the inlet plenum channel. The reactant outlet is near the outlet end of the reactant flow field and is located to the side of the plurality of reactant flow field channels. The reactant backfeed slot is on the side of the reactant flow field plate opposite the gas diffusion layer for the reactant and is fluidly connected to the reactant outlet. And, the reactant backfeed port fluidly connects the reactant backfeed slot to the outlet plenum channel.

The relief features incorporated in the reactant flow field plate include a landing, a relief plenum channel, a relief backfeed slot, and a relief backfeed port. The landing is adjacent the gas diffusion layer for the reactant and is configured to be transverse to the plurality of reactant flow field channels and to be located on the side of the outlet plenum channel opposite the plurality of reactant flow field channels. The relief plenum channel is adjacent the gas diffusion layer for the reactant and is configured to be transverse to the plurality of reactant flow field channels and to be located on the side of the landing opposite the outlet plenum channel. The relief backfeed slot is located on the side of the reactant flow field plate opposite the gas diffusion layer for the reactant and is fluidly connected to the reactant outlet. Finally, the relief backfeed port fluidly connects the relief backfeed slot to the relief plenum channel.

When such relief features are incorporated into the reactant flow field plate as described above, the gas diffusion layer for the reactant fluidly connects the outlet plenum channel to the relief plenum channel and thus serves as a relief outlet for reactant in case of blockage in the conventional backfeed architecture. In particular, this serves as a relief outlet for reactant at temperatures below freezing when the reactant backfeed slot is blocked with ice.

Such relief features are particularly suitable for use in fuel cells in which the plurality of reactant flow field channels are essentially parallel and linear. And, as mentioned above, the relief features may be employed in the oxidant and/or the fuel flow field plates. In the former case, the reactant is thus the oxidant, the reactant flow field plate is an oxidant flow field plate, the reactant inlet is an oxidant inlet, the reactant outlet is an oxidant outlet, the reactant backfeed slot is an oxidant backfeed slot, the reactant backfeed port is an oxidant backfeed port, and the gas diffusion layer for the reactant is the cathode gas diffusion layer. In the latter case, the reactant is the fuel, the reactant flow field plate is a fuel flow field plate, the reactant inlet is a fuel inlet, the reactant outlet is a fuel outlet, the reactant backfeed slot is a fuel backfeed slot, the reactant backfeed port is a fuel backfeed port, and the gas diffusion layer for the reactant is the anode gas diffusion layer.

The invention is suitable for use in solid polymer electrolyte fuel cells, and particularly in stacks of such fuel cells for high power density applications (e.g. automotive).

These and other aspects of the invention are evident upon reference to the attached Figures and following detailed description.

DETAILED DESCRIPTION

In this specification, words such as "a" and "comprises" are to be construed in an open-ended sense and are to be considered as meaning at least one but not limited to just one.

Herein, in a quantitative context, the term "about" should be construed as being in the range up to plus 10% and down to minus 10%.

At various places herein, the elements "outlet plenum channel", "landing", and "relief plenum channel" are indicated as being "transverse" to the plurality of reactant flow field channels. In this context, "transverse" is to be construed as meaning situated crosswise to the direction of the plurality of reactant flow field channels. While these elements may frequently be essentially perpendicular to the reactant flow field channels, they need not be and, for instance, can instead be at angles of from 80 to 100 degrees (or even outside this range) to the direction of the plurality of reactant flow field channels.

With regards to the locations of the reactant inlets and outlets in the reactant flow field plates, the term "to the side of" refers to what is known in the art as a sidefeed configuration. In such a configuration, the inlet or outlet is not located in line with the direction of the reactant flow field channels, but rather is located to be not in line with the direction of the reactant flow field channels, and thus off to the side of the reactant flow field channels.

Figure 1:
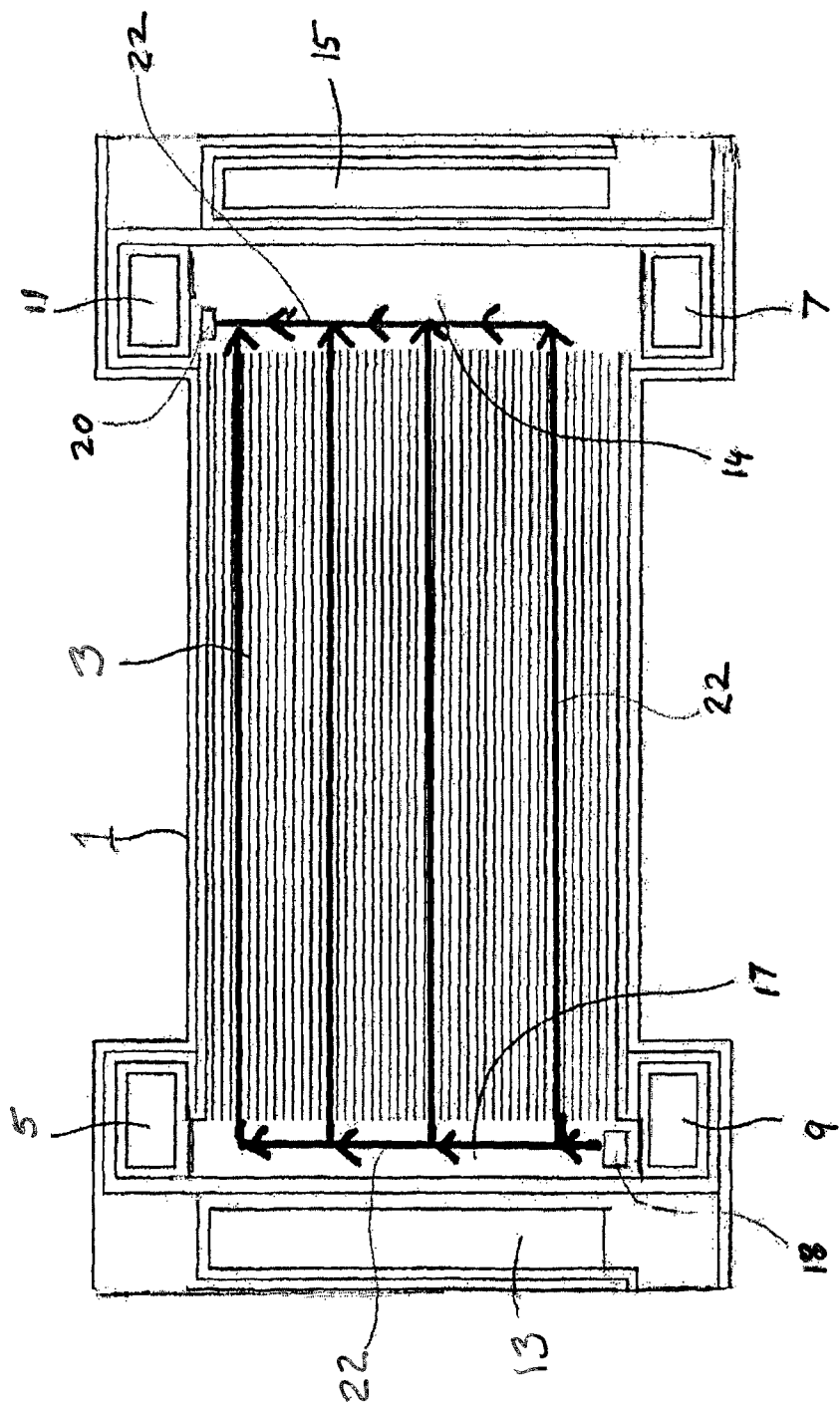
FIG. 1 shows a schematic view of the oxidant flow field side of an exemplary prior art oxidant flow field plate for a solid polymer electrolyte fuel cell.

A fuel cell stack design suitable for automotive purposes typically comprises a series stack of generally rectangular, planar solid polymer electrolyte fuel cells. Bipolar plate assemblies with oxidant and fuel flow fields on opposite sides and with coolant flow fields formed within are typically employed in such stacks. FIG. 1 shows a schematic view of the oxidant flow field side of an exemplary prior art oxidant flow field plate for such a fuel cell.

Oxidant flow field plate 1 incorporates reactant inlets and outlets with a sidefeed configuration and which connect to their respective flow fields with backfeed architecture. The inlet and outlet for the coolant is in line with the flow fields and does not have sidefeed configuration. Oxidant flow field plate 1 comprises oxidant flow field 3 which contains numerous essentially parallel, linear channels separated by a plurality of landings to distribute oxidant to, and remove by-products from, the cathode gas diffusion layer that would be adjacent to it in the assembled fuel cell. On the other side of plate 1, the inactive side, is a coolant flow field which is not visible in FIG. 1. The reactant inlets and outlets include fuel inlet 5, fuel outlet 7, oxidant inlet 9, and oxidant outlet 11. Plate 1 also comprises coolant inlet 13 and coolant outlet 15. When assembled into a complete fuel cell and then further stacked in series with other similar such cells, these common inlets and outlets for the reactant and coolant fluids align to form manifolds for the bulk distribution of these fluids throughout the stack.

The regions between oxidant flow field 3 and the various reactant inlets and outlets are the transition regions of plate 1. In the inlet transition region is inlet plenum channel 17 and oxidant backfeed port 18. Inlet plenum channel 17 is fluidly connected to an inlet end of the plurality of oxidant flow field channels in oxidant flow field 3, and also to oxidant backfeed port 18. In the embodiment shown in FIG. 1, inlet plenum channel 17 is configured transverse to the plurality of reactant flow field channels. An oxidant backfeed slot appears on the other side of plate 1 (not visible in FIG. 1) which fluidly connects oxidant backfeed port 18 to oxidant inlet 9. Collectively then, oxidant inlet 9 fluidly connects to oxidant flow field 3 via an oxidant backfeed slot (not visible), oxidant backfeed port 18, and inlet plenum channel 17.

In a like manner, outlet plenum channel 19 and oxidant backfeed port 20 appear in the outlet transition region. Outlet plenum channel 19 is fluidly connected to an outlet end of the plurality of oxidant flow field channels in oxidant flow field 3, and also to oxidant backfeed port 20. Outlet plenum channel 19 is configured transverse to the plurality of reactant flow field channels. Again, an oxidant backfeed slot appears on the other side of plate 1 (not visible in FIG. 1) which fluidly connects oxidant backfeed port 20 to oxidant outlet 11. Collectively then, oxidant outlet 11 fluidly connects to oxidant flow field 3 via an oxidant backfeed slot (not visible), oxidant backfeed port 20, and outlet plenum channel 19.

In normal operation, when there are no significant blockages in any of the passageways in oxidant flow field plate 1, oxidant gas flows in a Z-shaped pattern from oxidant inlet 9, through the backfeed architecture into inlet plenum channel 17, and uniformly through oxidant flow field 3. Then, depleted oxidant gas carrying by-product water vapor and liquid continues through oxidant flow field 3, into outlet plenum channel 19, out through oxidant backfeed port 20 and the oxidant backfeed slot on the other side of plate 2 (not visible), and finally out into reactant outlet 11. This oxidant gas flow is depicted schematically in FIG. 1 by bold arrows 22. However, in any situation resulting in a blockage in the flow of oxygen gas in the outlet backfeed region (e.g. ice formation in oxidant backfeed port 20), the flow of the depleted oxidant is restricted, perhaps completely. With nowhere else to go, flow either slows or possibly ceases.

Figure 2:
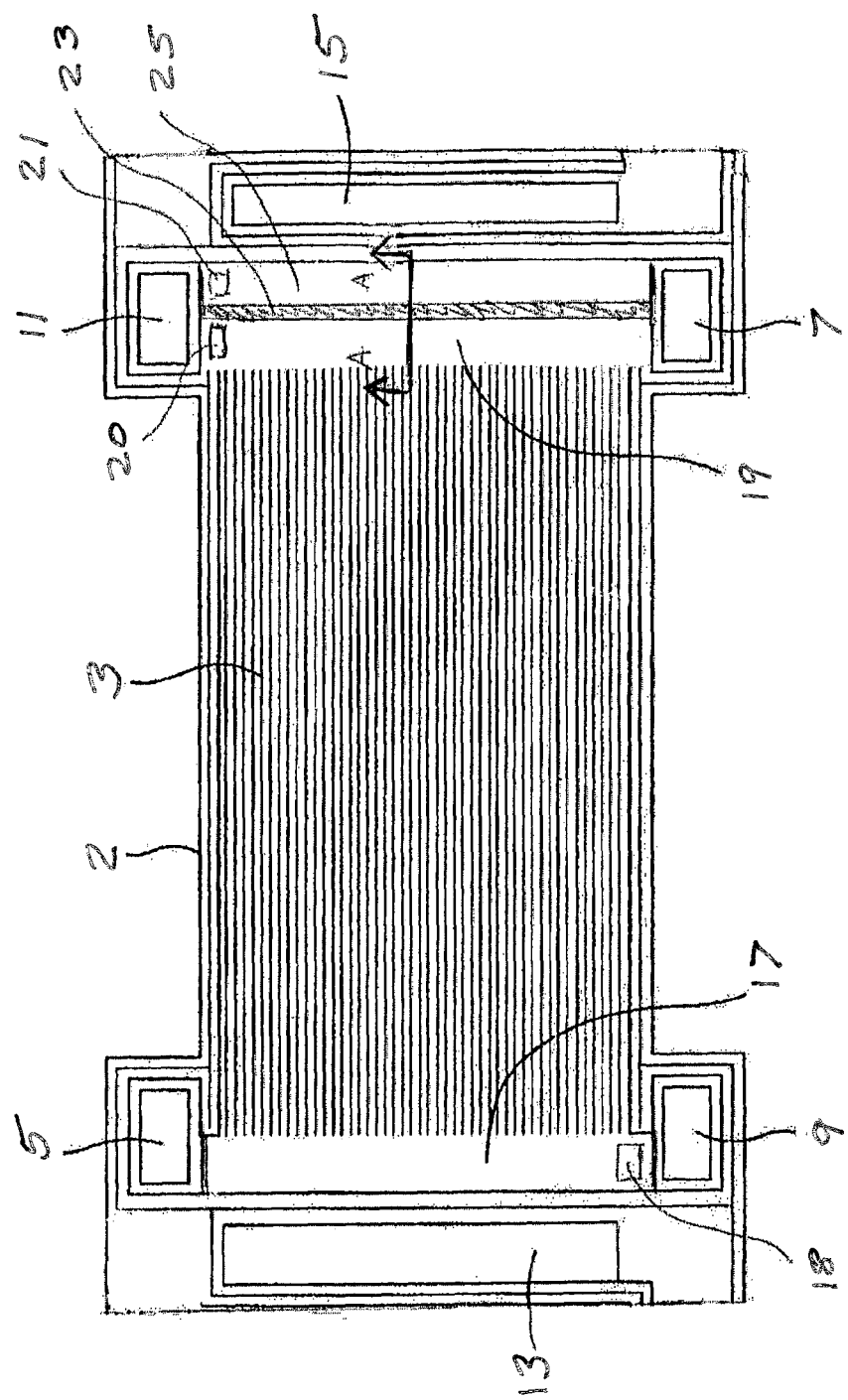
FIG. 2 shows a schematic view of the oxidant flow field side of an oxidant flow field plate which comprises relief features of the invention.

On the other hand, FIG. 2 shows an embodiment of the invention where a means for relief has been provided in case of any blockage in the flow of oxygen gas in the outlet backfeed region. There, a schematic view is shown for an oxidant flow field plate similar to that of FIG. 1, except that the embodiment of FIG. 2 comprises relief features of the invention.

To serve as relief features, in the outlet transition region, oxidant flow field plate 2 additionally comprises landing 23, relief plenum channel 25, relief backfeed port 21, and a relief backfeed slot which is on the other side of plate 2 (and not visible in FIG. 2). In an analogous manner to the arrangement of outlet plenum channel 19, oxidant backfeed port 20, and oxidant backfeed slot connecting the latter to oxidant outlet 11, relief plenum channel 25 is fluidly connected to relief backfeed port 21 and is configured transverse to the plurality of reactant flow field channels. Again, the relief backfeed slot appears on the other side of plate 2 (not visible in FIG. 2) and fluidly connects relief backfeed port 21 to oxidant outlet 11. Collectively then, oxidant outlet 11 fluidly connects to relief plenum channel 25 via a relief backfeed slot (not visible) and relief backfeed port 21. Landing 23 runs tranverse to the plurality of oxidant flow field channels and separates outlet plenum channel 19 from relief plenum channel 25. In the assembled fuel cell, landing 23 contacts an adjacent cathode gas diffusion layer.

In the embodiment of FIG. 2, there is therefore a path for depleted oxidant gas to flow from outlet plenum channel 19 to relief plenum channel 25, namely through the adjacent cathode gas diffusion layer itself. However, the resistance to the flow of gas through this path is substantially greater than that in outlet plenum channel 19. In normal operation, when there are no significant blockages in any of the passageways in oxidant flow field plate 2, only a small flow of gas occurs from outlet plenum channel 19 to relief plenum channel 25. And what gas does leak through joins the rest of the depleted oxidant gas exiting the fuel cell in the usual manner at oxidant outlet 11.

Figure 3:
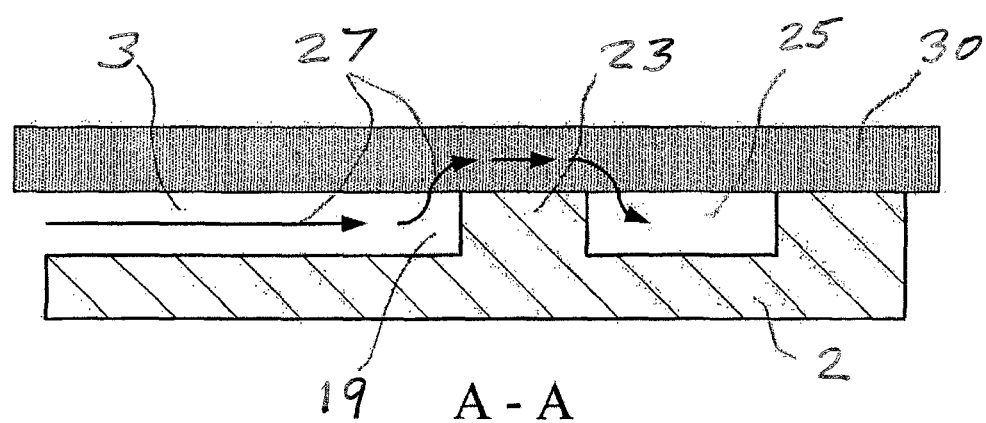
FIG. 3 shows a schematic cross sectional view of the oxidant flow field plate of FIG. 2 along section A-A and an adjacent cathode gas diffusion layer.

Now, if a blockage in the flow of oxygen gas in the outlet backfeed region should occur in the embodiment of FIG. 2, a relief path for the depleted oxidant gas is available through the cathode gas diffusion layer contacting landing 23. FIG. 3 schematically illustrates the relief path in the cross sectional view of oxidant flow field plate 2 along section A-A. FIG. 3 shows cathode gas diffusion layer 30 which would be present in an assembled fuel cell and adjacent landing 23. The relief flow of gas through cathode gas diffusion layer 30 is flow is depicted in FIG. 3 by bold arrows 27.

A relief outlet for the oxidant is thus provided for instance when temperatures are below freezing and oxidant backfeed slot 20 might be blocked with ice. The extent of relief available can be adjusted to some extent by adjusting the width of landing 23 in coordination with the permeability of cathode gas diffusion layer 30.

While the preceding discussion was directed towards use of the invention in the oxidant flow field plate, the invention can be similarly applied to the fuel flow field plate. And as will be apparent to those in the art, the invention can be applied to plates made of different materials (e.g. carbon, metal). Further, flow fields other than those comprising numerous linear, parallel reactant channels may be considered. Further still, in alternative embodiments, the shape and size of the inlets and outlets, plenum channels, and backfeed ports may vary from those illustrated in the Figures. And while the backfeed slots (not visible in the Figures) need to be on the side of the reactant flow field plate opposite the gas diffusion layer (i.e. the inactive side), the slots don't necessarily need to be formed in that plate itself. For instance, the backfeed slot or slots for an oxidant flow field plate may instead be completely or partially formed in a fuel flow field plate which is mated to the oxidant flow field plate to make a bipolar plate assembly.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A solid polymer electrolyte fuel cell comprising:
    a membrane electrode assembly comprising a solid polymer electrolyte and an anode and a cathode on opposite sides of the solid polymer electrolyte;
    an anode gas diffusion layer for a fuel adjacent the anode;
    a cathode gas diffusion layer for an oxidant adjacent the cathode;
    a reactant flow field plate for a reactant selected from the group consisting of the fuel and the oxidant, the reactant flow field plate comprising a reactant flow field adjacent the gas diffusion layer for the reactant wherein the reactant flow field comprises a plurality of reactant flow field channels fluidly connected to an inlet plenum channel at an inlet end of the reactant flow field and to an outlet plenum channel at an outlet end of the reactant flow field wherein the outlet plenum channel is transverse to the plurality of reactant flow field channels;
    a reactant inlet in the reactant flow field plate near the inlet end of the reactant flow field and fluidly connected to the inlet plenum channel;
    a reactant outlet in the reactant flow field plate near the outlet end of the reactant flow field and to the side of the plurality of reactant flow field channels;
    a reactant backfeed slot on the side of the reactant flow field plate opposite the gas diffusion layer for the reactant and fluidly connected to the reactant outlet; and
    a reactant backfeed port in the reactant flow field plate fluidly connecting the reactant backfeed slot to the outlet plenum channel;
    wherein the fuel cell additionally comprises:
    a landing in the reactant flow field plate and adjacent the gas diffusion layer for the reactant wherein the landing is transverse to the plurality of reactant flow field channels and located on the side of the outlet plenum channel opposite the plurality of reactant flow field channels;
    a relief plenum channel in the reactant flow field plate and adjacent the gas diffusion layer for the reactant wherein the relief plenum channel is transverse to the plurality of reactant flow field channels and located on the side of the landing opposite the outlet plenum channel;
    a relief backfeed slot on the side of the reactant flow field plate opposite the gas diffusion layer for the reactant and fluidly connected to the reactant outlet; and
    a relief backfeed port in the reactant flow field plate fluidly connecting the relief backfeed slot to the relief plenum channel.

2. The solid polymer electrolyte fuel cell of claim 1 wherein the gas diffusion layer for the reactant fluidly connects the outlet plenum channel to the relief plenum channel.

3. The solid polymer electrolyte fuel cell of claim 1 wherein the plurality of reactant flow field channels are essentially parallel and linear.

4. The solid polymer electrolyte fuel cell of claim 1 wherein the reactant is the oxidant, the reactant flow field plate is an oxidant flow field plate, the reactant inlet is an oxidant inlet, the reactant outlet is an oxidant outlet, the reactant backfeed slot is an oxidant backfeed slot, the reactant backfeed port is an oxidant backfeed port, and the gas diffusion layer for the reactant is the cathode gas diffusion layer.

5. The solid polymer electrolyte fuel cell of claim 1 wherein the reactant is the fuel, the reactant flow field plate is a fuel flow field plate, the reactant inlet is a fuel inlet, the reactant outlet is a fuel outlet, the reactant backfeed slot is a fuel backfeed slot, the reactant backfeed port is a fuel backfeed port, and the gas diffusion layer for the reactant is the anode gas diffusion layer.

6. A solid polymer electrolyte fuel cell stack comprising a series stack of a plurality of the solid polymer electrolyte fuel cells of claim 1.

7. A method of providing a relief outlet for a reactant in a solid polymer electrolyte fuel cell, the fuel cell comprising:
    a membrane electrode assembly comprising a solid polymer electrolyte and an anode and a cathode on opposite sides of the solid polymer electrolyte;
    an anode gas diffusion layer for a fuel adjacent the anode;
    a cathode gas diffusion layer for an oxidant adjacent the cathode;
    a reactant flow field plate for a reactant selected from the group consisting of the fuel and the oxidant, the reactant flow field plate comprising a reactant flow field adjacent the gas diffusion layer for the reactant wherein the fuel flow field comprises a plurality of fuel flow field channels fluidly connected to an inlet plenum channel at an inlet end of the reactant flow field and to an outlet plenum channel at an outlet end of the reactant flow field wherein the outlet plenum channel is transverse to the plurality of reactant flow field channels;
    a reactant inlet in the reactant flow field plate near the inlet end of the reactant flow field and fluidly connected to the inlet plenum channel;
    a reactant outlet in the reactant flow field plate near the outlet end of the reactant flow field and to the side of the plurality of reactant flow field channels;
    a reactant backfeed slot on the side of the reactant flow field plate opposite the gas diffusion layer for the reactant and fluidly connected to the reactant outlet; and
    a reactant backfeed port in the reactant flow field plate fluidly connecting the reactant backfeed slot to the outlet plenum channel;
    the method comprising:
    providing a landing in the reactant flow field plate and adjacent the gas diffusion layer for the reactant wherein the landing is transverse to the plurality of reactant flow field channels and located on the side of the outlet plenum channel opposite the plurality of reactant flow field channels;
    providing a relief plenum channel in the reactant flow field plate and adjacent the gas diffusion layer for the reactant wherein the relief plenum channel is transverse to the plurality of reactant flow field channels and located on the side of the landing opposite the outlet plenum channel;
    providing a relief backfeed slot on the side of the reactant flow field plate opposite the gas diffusion layer for the reactant and fluidly connected to the reactant outlet; and
    providing a relief backfeed port in the reactant flow field plate fluidly connecting the relief backfeed slot to the relief plenum channel.

8. The method of claim 7 wherein the gas diffusion layer for the reactant provides a relief outlet for the reactant from the outlet plenum channel to the relief plenum channel.

9. The method of claim 8 wherein the gas diffusion layer for the reactant provides a relief outlet for the reactant at temperatures below freezing when the reactant backfeed slot is blocked with ice.

* * * * *